Patented Apr. 29, 1930

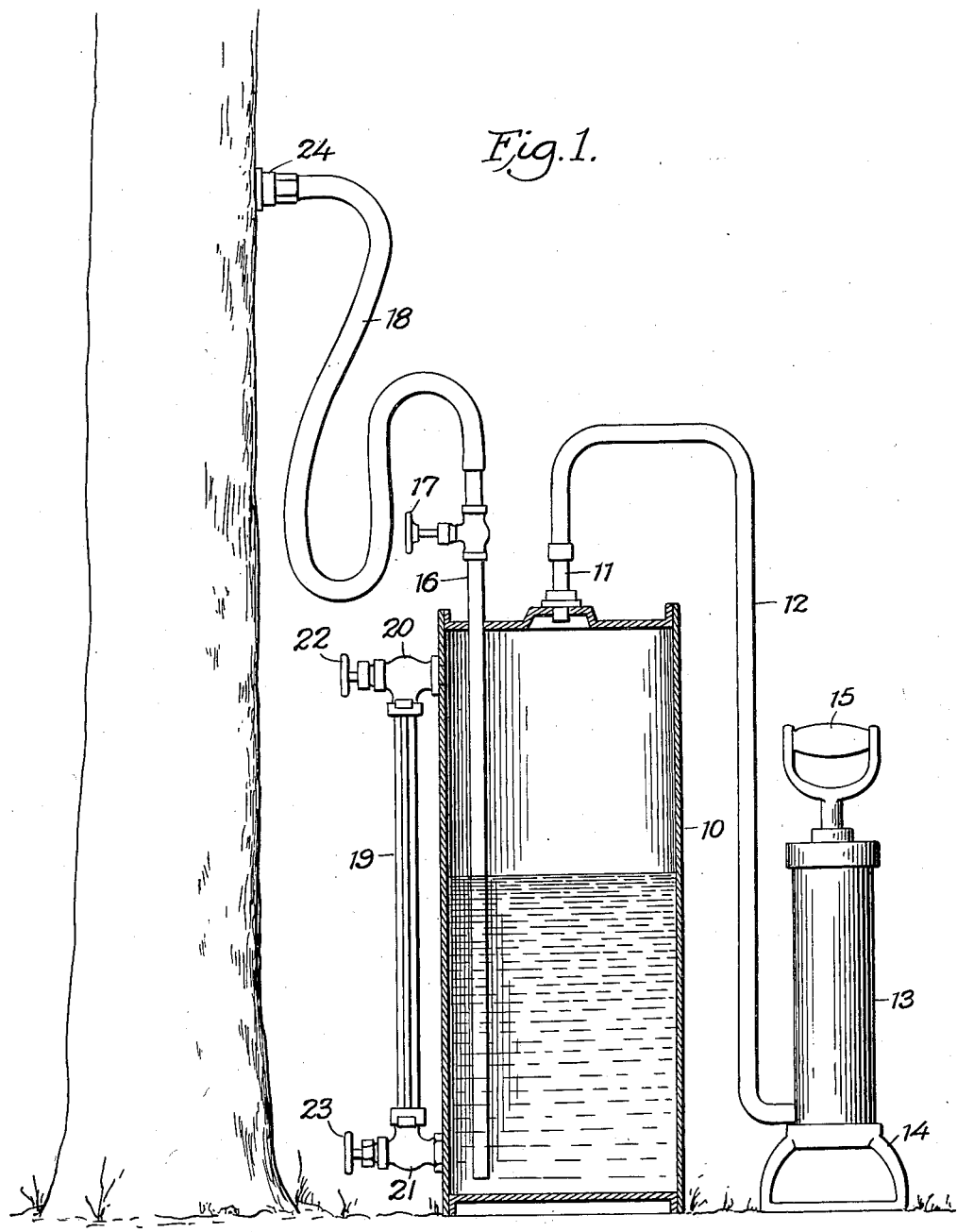

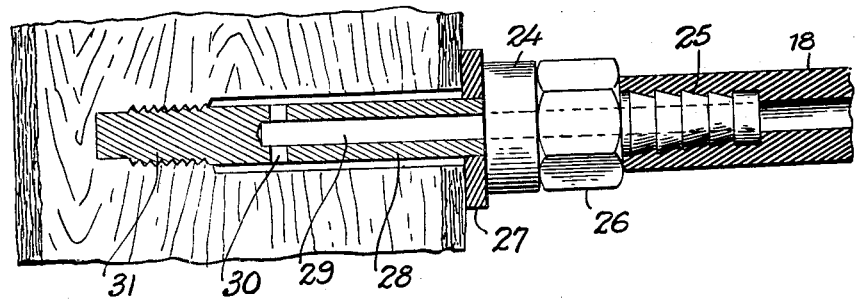
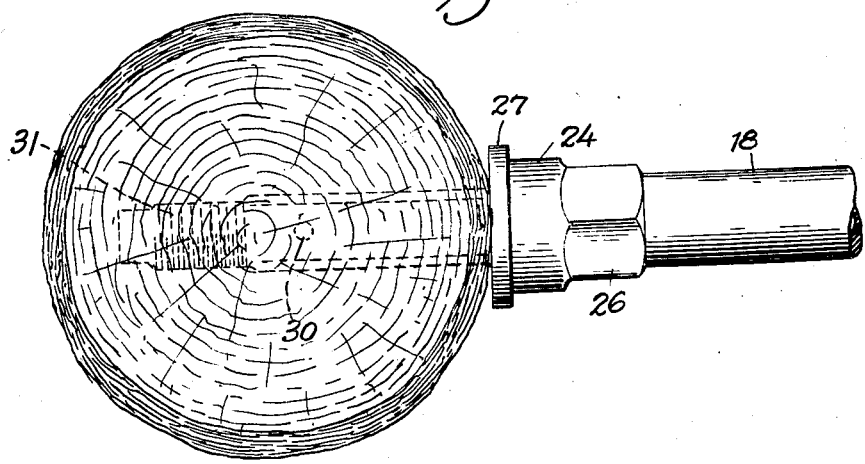

1,756,453

UNITED STATES PATENT OFFICE

PAUL H. DAVEY AND HOMER L. JACOBS, OF KENT, OHIO, AND JAMES A. DAVEY, OF SOUND BEACH, CONNECTICUT; SAID HOMER L. JACOBS ASSIGNOR TO THE DAVEY TREE EXPERT COMPANY, OF KENT, OHIO, A CORPORATION OF OHIO

METHOD OF TREATING TREES AND APPARATUS THEREFOR

Application filed January 2, 1929, Serial No. 329,753, and in Canada October 10, 1927.

Our said invention relates to a method of treating trees and an apparatus for carrying out said method, the primary object of the invention being to provide improved means for controlling certain diseases of trees and certain insects infesting trees, reference being had particularly to boring insects. It has heretofore been proposed to do this by introducing appropriate chemicals into the tree, either by placing chemicals in borings in tree trunks whereby they would be carried up by the sap, or in tanks approximately at the level of such borings, or by gravity feed of solutions placed in reservoirs located approximately at the extreme height of the tree to be treated. According to the last method a hose is led down from the reservoir to the point of injection near the base of the tree; thus developing a pressure on the fluid about equal to the hydrostatic pressure in the conducting vessels of the tree.

The method which we have developed represents an improvement on the gravity feed method in that we have produced equipment by means of which trees can be injected from the ground with pressures which not only equal the hydrostatic pressure in the tree but which may be made to greatly exceed these hydrostatic pressures and which will therefore greatly speed up the rate of injection. Our apparatus therefore accomplishes two important improvements over previous practice: First, convenience in installing and maintaining the injection process; and, second, in speeding up the injection process by the use of greater pressures.

The process of injection of trees by the use of reservoirs placed at the extreme height of the tree is difficult because it involves the climbing of the tree to install the apparatus and, if necessary, the occasional lowering and raising of the reservoirs for refilling. Our process is very much easier for the reason that it can all be handled from the ground.

In the second place, the injection of a large tree by a gravity feed sometimes consumes nearly a whole day's time, whereas we can greatly shorten the time consumed by increasing the pressure on the fluid. These matters are facts that have been definitely proved in an experimental way.

In the drawings, which are made a part of this application and in which similar reference characters indicate similar parts:

Fig. 1 is an elevation of our device in use, partly in section,

Fig. 2, a detail of a nozzle partly in section, and

Fig. 3, another view of the nozzle.

In the drawings reference character 10 indicates a container for a solution of suitable character for controlling insect pests, or diseases affecting trees, as the case may be. An air valve 11 is secured to the upper end thereof in any suitable manner and is provided with means for attachment of a conduit 12, which may be the tube of a tire pump or any other suitable source of air or gas under pressure. As here shown a pump is attached to the conduit 12, said pump comprising a cylinder 13, a base 14 and a handle 15 for actuating a plunger of ordinary form.

A pipe 16 extends through the top of the container and nearly to the bottom thereof said pipe having a valve 17 above the container. A flexible tube 18 leads from the pipe 16 to the trunk of the tree, to which it is attached in any desirable way for injecting the solution thereinto.

A graduated glass tube 19 is located at one side of the container and connected thereto at top and bottom by fittings 20 and 21 provided with valves 22 and 23.

A perfected means for injecting a solution into a tree is indicated at 24 in Fig. 1 and in greater detail in Figs. 2 and 3. This means comprises a nozzle attached to the hose 18 by a ribbed portion 25 of conventional form and having a hexagonal head 26 for application of a wrench. A washer 27, preferably of somewhat yieldable material is located between the tree and a flat face on the nozzle, said washer surrounding a reduced portion 28 having a central passage at 29 and ports at 30. The outer end of the nozzle is threaded as indicated at 31. The nozzle is not merely held up to the opening but is securely anchored therein by its threaded portion in such a manner as to provide an effective seal between the surface of the tree and the adjacent flat face of the nozzle, by compression of washer 27. The ports provide egress at various points about the nozzle to permit the liquid to be forced out at all sides of the nozzle against the wood and so constitute effective means for diffusing the solution by forcing it directly into the sap ducts of the tree. The plurality of ports is of value also in case the anchoring means should be eccentrically located in the hole so as to block one or more of the ports, since some of the ports will always remain exposed.

In preparing for operation a hole is bored in the tree crosswise of the fibers so as to expose the ends of the fibers and of the sap ducts in the wood and the cambium layer to the solution, the inner end of the hole which receives the threaded portion 31 being of reduced diameter. It follows from this that when the nozzle is screwed into position a chamber is left about the part 28 so that the solution can act on the entire periphery of the enlarged part of the opening. In securing the nozzle in place the depth of the reduced portion is made such that as the nozzle approaches its working position the washer 27 is forced against the bark so tightly as to seal the opening and prevent any leakage.

A solution of the desired character is put into the container in any suitable manner, and the container is tightly closed, the glass tube showing the amount in the container. Air is forced into the container by the pump sufficient to place the liquid under such pressure as may be desirable for injecting it into the tree with such speed as may be found proper, the air valve preventing escape of air in usual manner. Valve 17 being opened the solution will be injected into the tree, the pressure being kept up by further use of the air pump from time to time. The charge of solution in the container may be proportioned as required for a particular tree, or more may be added when the gauge shows it to be getting low. The pressure will ordinarily be in excess of the normal hydrostatic pressure of the sap and preferably the flow of solution will be started before the nozzle is screwed down tight, so as to force the air out of the chamber about the part 28 and thus facilitate the operation.

This application is a continuation in part of our application Serial No. 198,978, filed June 15, 1927.

It will be obvious to those skilled in the art that various modifications may be made in our device and in the process practiced thereby, all without departing from the spirit of the invention and therefore we do not limit ourselves to what is shown in the drawings and described in the specification but only as indicated in the appended claims.

Having thus fully described our said invention what we claim as new and desire to secure by Letters Patent is:

1. A method of injecting fluid into trees comprising forming an opening crosswise of the fibers, anchoring and seating a diffusing means in said opening, and forcing fluid into the diffusing means under a pressure in excess of the hydrostatic pressure of the sap.

2. A method of injecting fluids into trees comprising forming an opening crosswise of the fibers said opening being of reduced size at its inner end, anchoring a diffusing means at said inner end so as to leave a chamber between the diffusing means and the wall of the enlarged outer end of the opening and simultaneously sealing the opening, and forcing fluid into said chamber under a pressure in excess of the hydrostatic pressure of the sap.

3. A device for treating trees comprising a closed container for liquid, means for introducing air under pressure into the upper end of the container, a conduit leading from the lower part of the container, a nozzle connected to the conduit said nozzle having a central passage, a threaded outer end on said nozzle, and ports leading from the central passage to the exterior of the nozzle back of said threaded portion.

4. A device as in claim 3, the outer end of said nozzle being permanently closed.

In testimony whereof we affix our signatures.

PAUL H. DAVEY.
HOMER L. JACOBS.

In testimony whereof I affix my signature.
JAMES A. DAVEY.